United States Patent Office 3,044,095
Patented July 17, 1962

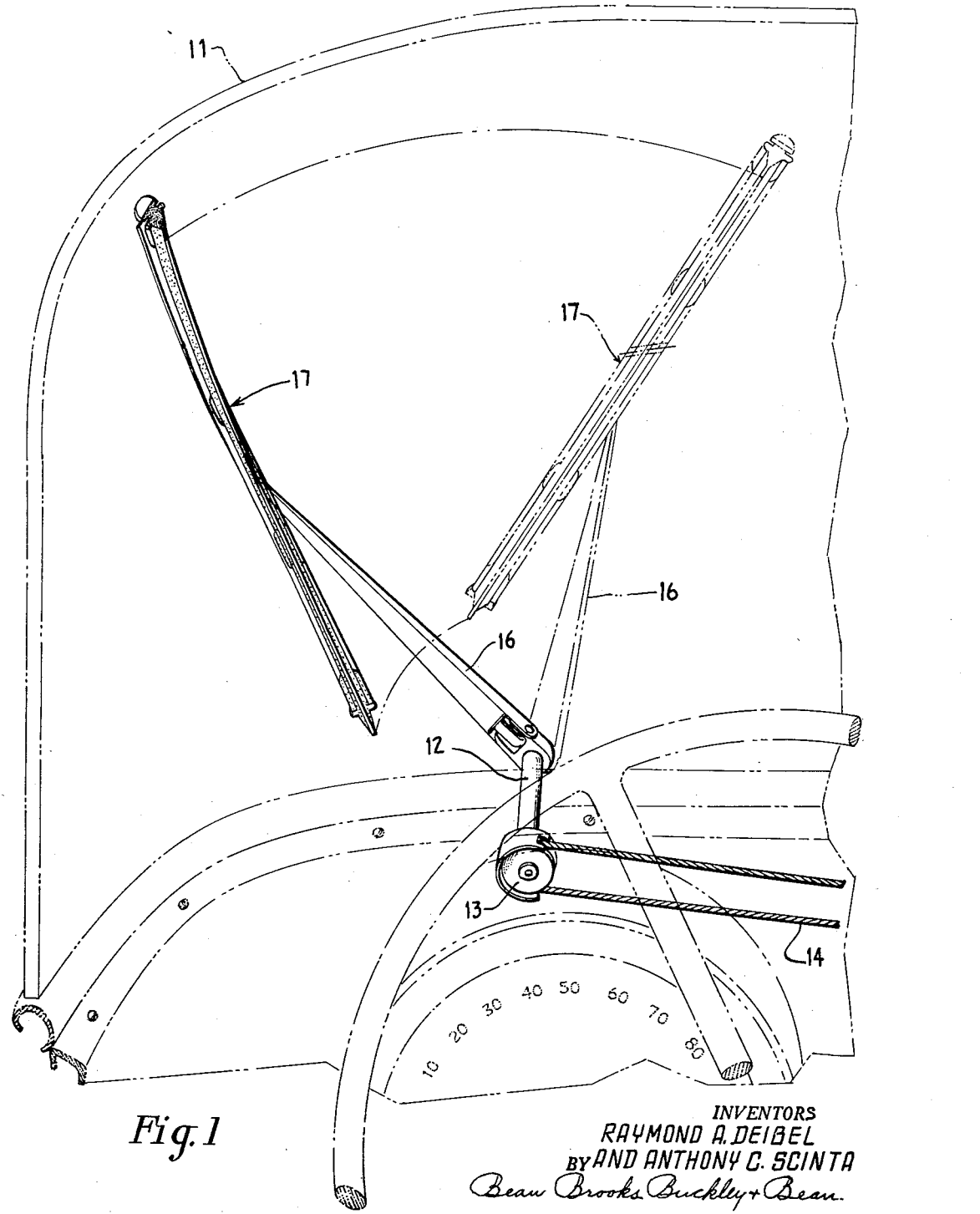

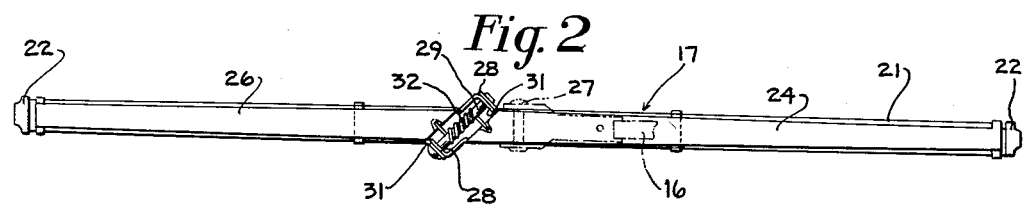
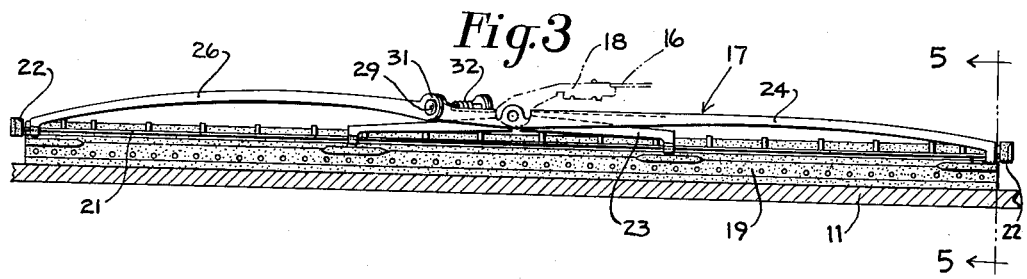
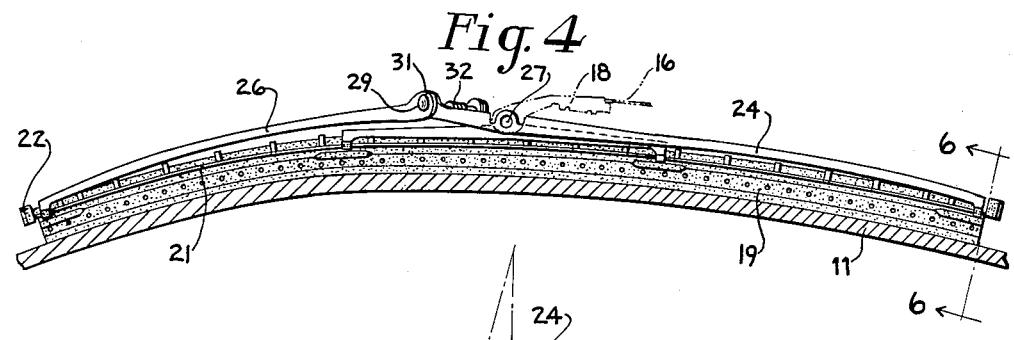
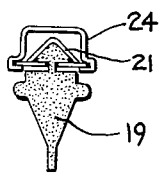
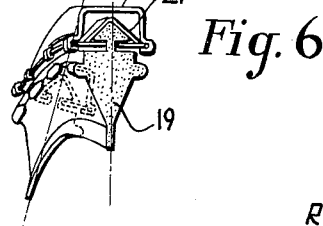

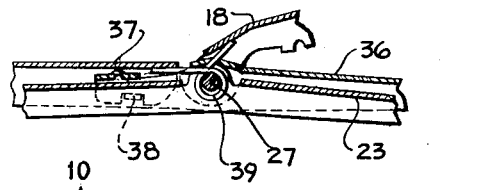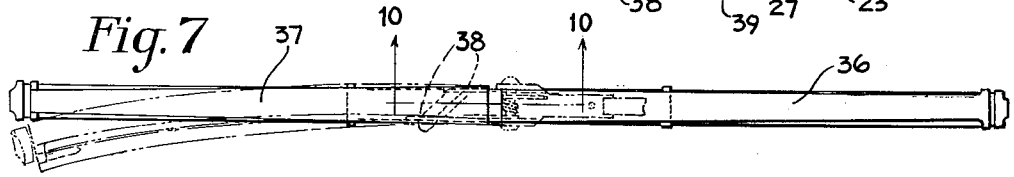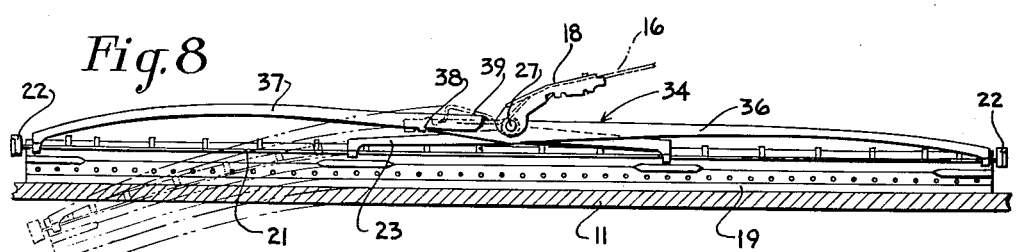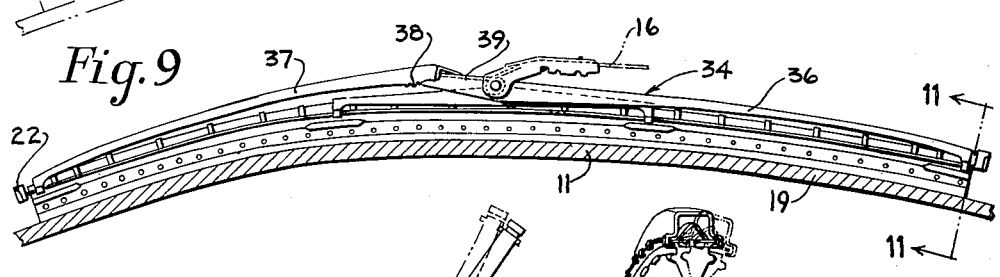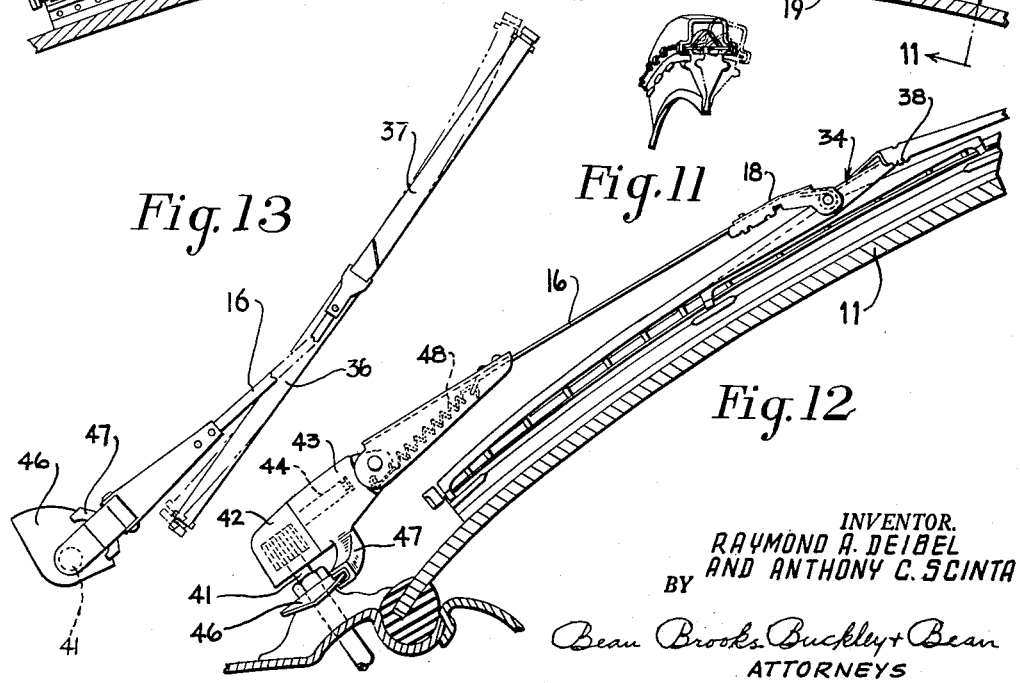

3,044,095
WINDSHIELD WIPER
Raymond A. Deibel, Cheektowaga, and Anthony C. Scinta, Hamburg, N.Y., assignors to Trico Products Corporation, Buffalo, N.Y.,
Filed Sept. 10, 1956, Ser. No. 608,950
19 Claims. (Cl. 15—250.42)

This invention relates to windshield wipers, and more particularly to windshield wipers for use on motor vehicles having curved glass windshields, including the wraparound type windshield.

In the wiping of a vehicle windshield, it has been found that most satisfactory wiping results are obtained if the average position of the wiper blade or squeegee can be maintained normal to the surface being wiped. However, if the blade superstructure, which is to positionally maintain the blade in operative position, can be arranged to cause the drag angle of the blade to be of a predetermined amount and equal in both directions of wiping motion, generally good results can be obtained.

The wraparound type windshield presents a skewed contour in the region where the slightly curved frontal area joins with the sharply curved lateral areas, and this region extends more or less virtually at a point that is somewhat towards the side margins of the windshield from the position of the windshield wiper pivot. Consequently, the blade is in somewhat of a diagonal position as it passes over from the frontal area to the lateral area, and the surface of the windshield at one end of the blade is out of parallel with the surface at the other end of the blade. Therefore, in order for each end of the blade to be properly positioned relative to the surface over which it is operating, one end of the blade must be spiraled or twisted relative to the other. The present invention solves the problem by providing a wiper blade, all parts of which are automatically maintained substantially normal to the windshield surface over which they are operating, and throughout full range of wiper travel, irrespective of windshield contour. In addition, the present invention provides a wiper blade which may be used with a standard type wiper arm, and also may be used with a wiper arm which is caused to oscillate upon an axis normal to the rockshaft axis, an arrangement found in copending patent applications as will be set forth hereinafter.

In one of the end positions of wiping action, the blade is positioned diagonally across a relatively flat portion of the windshield at one end of the blade, while the other end of the blade extends diagonally around a curved portion of the windshield. At the point where the blade engages the curved portion and lies in an angular position with the windshield curve, it becomes necessary for this part of the blade to be positioned askew, or out of square, with the other part of the blade.

In the wiper blade of the invention, a twist or spiral is introduced in the blade itself, by means of an oblique axis, or diagonal pivot formed in the blade. Thus as the blade passes from the vertical around toward the panoramic curvature, and the outboard end of the blade approaches the position of lying diagonally across the curvature of the shield, the end of the blade moves down or inwardly and the structure supporting it pivots down or inwardly on the oblique axis to cause a twist which is imparted to the outer end of the supporting structure, and thereby to the corresponding end of the wiper blade.

The degree of obliquity of the pivot is determined for a particular installation so that with the amount of movement necessary to maintain contour contact of the blade on the windshield, there will be imparted a correspondingly correct amount of the rotational or twisting movement of the blade element itself in order to hold the wiper element substantially normal to the surface over which it is being operated.

Since adjustment of the angular position is mostly needed on the outboard end, the spiralling result in the blade structure accomplishes the purpose of holding the outer end normal to the surface, where it operates without distorting the proper position of the other parts of the blade, which retain their otherwise supported position because they are not subjected to any of the above sectionally rotational movements on the longitudinal axis of the blade.

An object of the invention is to provide a blade as a self-contained unit to perform these wiping functions when mounted on a standard blade-carrying arm oscillated on a fixed axis.

Attention is directed to the copending application No. 559,180, filed January 16, 1956, in which provision is made for diagonal pivoting of a portion of the arm intermediate the supporting shaft and the blade attachment. In this latter usage of the diagonal pivot the entire blade structure is subjected to a change of attitude which is responsive to the variation in the diagonal movement. Another form of pivotal mounting of a wiper blade to a wiper arm is shown in copending application No. 548,346, filed November 22, 1955, now Patent No. 2,973,542.

In the instant invention the attitude of one part of the blade is changed without changing the attitude of an opposite end of the blade.

The main object of this invention is to provide a windshield wiper for use on motor vehicles wherein all parts of the wiper blade are maintained substantially normal to the windshield surface over which they are operated during wiping operations, even where the windshield contour is sharply curved.

A more specific object of this invention is to provide a windshield wiper for use on motor vehicles having wraparound type windshields wherein the wiper blade is maintained substantially normal to the windshield surface throughout full range of wiper travel irrespective of windshield contour.

These and further objects and features of the invention will become more apparent from the following description and the accompanying drawings wherein:

FIG. 1 is a fragmentary view of the windshield wiper embodying the principles of the invention illustrated during wiping operation upon the vehicle windshield;

FIG. 2 is a plan view of the windshield wiper of FIG. 1;

FIG. 3 is a side view of the windshield wiper of FIG. 1;

FIG. 4 is the windshield wiper of FIG. 1 showing the curved position assumed by the wiper during wiping operation;

FIG. 5 is an end view as seen from line 5—5 in FIG. 3;

FIG. 6 is an end view as seen from line 6—6 in FIG. 4;

FIG. 7 is a plan view of another embodiment of a windshield wiper according to the invention;

FIG. 8 is a side view of the windshield wiper of FIG. 7;

FIG. 9 is a side view of the windshield wiper of FIG. 7 showing the curved position assumed by the wiper during one phase of wiping operation;

FIG. 10 is a fragmentary view as seen from line 10—10 in FIG. 7;

FIG. 11 is an end view as seen from line 11—11 in FIG. 9;

FIG. 12 is a section view of the windshield wiper of the invention as mounted upon a special type of wiper arm; and FIG. 13 is a partial plan view of the wiper arm of FIG. 12.

Referring now to the drawings and more particularly to FIG. 1, the numeral 11 identifies a vehicle windshield of the wraparound type as seen looking from the operator's position from within the vehicle. A pair of wiper arm rockshafts 12 (one shown) are positionally arranged to extend upwardly through the vehicle cowling, the inner end of the rockshaft having a pulley 13 and a cable 14, the latter of which is operatively connected to a wiper motor (not shown), the outer end of the rockshaft supporting a wiper arm 16, all in the usual manner. The wiper arm removably supports the wiper blade assembly 17, by means of a clip member 18 arranged for the convenient mounting or demounting of the wiper blade assembly 17 from the wiper arm 16. Details of said clip, which forms no part of this invention, are set forth in Patent No. 2,752,626, issued July 3, 1956.

The wiper blade assembly 17 comprises an elongated elastic, readily deformable member or squeegee 19, of material such as rubber, which is supported along its upper edge within a resilient element 21, a pair of end caps 22, one of each secured to the ends of the flexible member, and a plurality of lever members 23, 24, and 26, arranged to form a superstructure for the operative support of the flexible member 21 and squeegee 19. The lever or yoke member 23 is pivotally secured at its midpoint to a transversely arranged pin 27, while each end is arranged to slidingly engage the edges of the resilient element 21. Lever member 24 is pivotally affixed near one end to the pin member 27, the other end being arranged to slidingly engage the edges of the resilient element 21, the opposite end of the elever member being formed to provide ears 28 for receipt of a pin 29, the longitudinal axis of which is at a predetermined angle to the longitudinal axis of the lever member 24. Lever member 26 is arranged at one end to slidingly engage the edges of the resilient element 21, while on the opposite end is formed a pair of ears 31 for pivotally affixing the lever to the pin 29. A torsion spring 32 surrounding the pin 29 is arranged to have one end in engagement with the top surface of the lever 26, the other end of the spring engaging the top surface of the lever 24.

It will be seen that the arrangement of the levers 24 and 26 is such as to maintain the elastic member 19 vertically upright when the wiper is pressed against a relatively flat surface, whereas, the lever member 26 will provide a twist to the elastic member 19 due to rotation downwardly about its pivoted connection, when the wiper arm is applied to a curved surface (FIG. 4). The angle, or twist, is more clearly indicated in FIG. 6, which shows the degree of twist, or skew, between opposite ends of the wiper blade when in the FIG. 4 position. The downward rotational movement of the lever member 26 about its pivoted connection, is assured by the action of torsion spring 32, which is pre-stressed during assembly to cause such relative movement. In such manner, the squeegee 19 will not only be made to automatically conform to the contour of the windshield and assume a substantially normal relationship thereto throughout its full length, but will also snugly engage the windshield under the urging of torsion spring 32 to assure good wiping thereof. Obviously, the angle at which the pin 29 is arranged relative the longitudinal axis of the lever member 24 is a factor contributing to the degree of twist in the blade realized upon any given curved surface. Furthermore, said angle will be directly opposite on the blades for use on the left side of the vehicle windshield, as compared to the blades for use on the right side of the vehicle. If desired, the lever member 26 may incorporate more than one angularly arranged pivoted joint to accommodate the wiper blade to a windshield contour of greater irregularity than the one illustrated.

A modified type of wiper arm, embodying the principles of the invention, is illustrated in FIGS. 7 to 10. For the purpose of brevity, parts identical with those in the windshield wiper above described, will be given identical reference numbers. A wiper blade 34, representing the modified embodiment includes elongated member, or squeegee 19, the resilient member 21, and the lever or yoke member 23 which is adapted to slidably engage the edges of the resilient member. A pair of lever members 36 and 37, are pivotally joined at one end, the other ends of the levers slidably engaging the edges of the resilient member 21. The end caps 22, mounted upon the extreme ends of the resilient member 21, restrict longitudinal movement of the resilient member relative to the lever assembly or superstructure. Pivotal connection between levers 36 and 37 is formed at an oblique angle relative to the longitudinal axis of the wiper, whereby lever movement about said pivotal connection will result in non-coplanar movement of the lever members as they rotate about the pivoted connection. As best seen in FIG. 11, the ends of the wiper blade will assume some angle when the levers move relative to each other about the pivotal connection. It is to be noted that the pivotal connection in this embodiment does not include a pivot pin, such as the pin 29, found in the wiper arm previously described; rather the end of the lever member 37 has integral fulcrum lugs 38 which are bent to engage slots formed in the end of the lever member 36. Clip member 18 is pivotally affixed in the mid-region of the wiper by means of the pin member 27, while a torsion spring surrounds the pin member 27. One end of the torsion spring 39 is arranged to abut the underside of the clip member 18, the other end of the torsion spring being arranged to abut the underside of the lever member 37, on the side of the oblique pivotal connection toward the mid-region of the blade.

It will be seen that when the wiper blade is upon a relatively flat part of the windshield, as illustrated in FIG. 8, the angle formed between the clip member 18 and the lever member 36 is greater than when the wiper blade is upon a curved portion of the windshield, as illustrated in FIG. 9. In effect, when the wiper blade moves from the FIG. 8 position to the FIG. 9 position, the torsion spring 39 is further tensioned by reason of the clip member engaging the end of the torsion spring, which results in greater force being exerted by the other end of the spring upon the end of the lever member 37. As a result, the contact force of the wiper blade upon the windshield will not be substantially reduced as the wiper blade moves from a relatively flat portion of the windshield to the curved portion of the windshield. Thus in the modified embodiment of the invention the windshield wiper will not only automatically assume a substantially normal position relative to the windshield being wiped, but in addition, the blade contact pressure will not be severely altered as one end of the wiper blade bends around the sharply curved portion of the windshield. Hence, the modified embodiment of the windshield wiper provides a very effective wiper for use on wraparound type windshields.

Referring to FIGS. 12 and 13, the wiper blade 34 is mounted upon a wiper arm adapted for turning movement about an axis normal to the rockshaft to give the wiper arm a compound arcuate movement, such a wiper arm arrangement being more fully shown and described in copending patent application Serial No. 464,967 filed October 27, 1954, now Patent 2,781,540. In such an arrangement, a rockshaft 41 has removably affixed to the end thereof a mounting head 42, which includes a portion 43 adapted to turn upon an axis 44 arranged normal to the rockshaft 41. A cam plate 46 is positioned about the rockshaft, while a cam follower 47 is formed integral with the portion 43. It will be seen that as the mounting head 42 is rotated by the rockshaft 41, the portion 43 will be rotated upon the axis 44 by reason of the cam follower 47 riding upon the cam plate 46. Such rotary motion will be transmitted to the wiper arm 16 which is pivotally connected to the portion 43, said connection including a tension spring 48 arranged to urge the wiper arm in the direction of the windshield lever.

The advantage gained by using the wiper of the invention viz., wiper blade assembly 17 or 34, with the cam control wiper arm, is that the wiper blade may be better maintained normal to the windshield along a full length of the blade as the latter moves upon the windshield. In other words, the rotary motion induced by the revolving wiper arm 16 acts to maintain the lower end of the wiper blade i.e., the end closer to the rockshaft, normal to the windshield surface, and at the same time greater angular movement is achieved by the outer end of the wiper arm. The advantage of using the wiper arm of the invention with the rotating wiper arm arrangement disclosed in copending patent application Serial No. 464,967, now Patent 2,781,540 is that the cam plate 46 need not be as sharply curved to achieve normalizing of the wiper blade. Such a reduction in cam profile height results in reduced frictional force between the cam follower 47 and the cam plate 46, contributing to cam life, and less wear and tear on the associated moving parts. In addition, such reduction in cam plate height results in less reciprocating axial movement of the rockshaft 41, as is necessary to offset the axial movement generated by the cam plate curvature. Other features and advantages of the use of the wiper arm of the invention with the cam driven wiper arm will undoubtedly suggest themselves.

It may be mentioned that the arrangement for applying a compound motion to the wiper arm as set forth in copending patent application Serial 559,180, may likewise serve as a mounting means for the wiper blade of the invention to achieve results somewhat similar to that obtained when the wiper blade is used with the wiper arm as shown and disclosed with reference to FIGS. 12 and 13.

From the foregoing it will be seen that the principles of the invention may be applied to provide a windshield wiper for use on motor vehicles having wraparound type windshields, wherein the wiper blade is automatically maintained substantially normal to the windshield surface throughout full range of wiper travel irrespective of windshield contour. Such a result is obtained by the novel arrangement of the lever members of the invention whereby a resilient member is caused to flex in more than one plane to achieve a squeegee twist, or skew as required to maintain the squeegee substantially normal to the surface on any given windshield of irregular contour during movement thereupon. Furthermore, it will be seen that the windshield wiper may be used on a standard type wiper arm, or on a wiper arm that is given a compound arcuate movement by means of a cam motion control, or in some other manner, as set forth in the mentioned copending applications.

The foregoing description has been given in detail without thought of limitation since the inventive principles involved are capable of assuming other physical embodiments without departing from the spirit of the invention and the scope of the appended claims.

What is claimed is:

1. A windshield wiper for use on curved windshields having irregular surface contours, comprising a squeegee, a resilient member for the operative surface conformance of the squeegee, and lever members connected to the resilient member and forming a superstructure for the positional maintenance of the resilient member, said lever members being hinged together on a diagonal axis relative to the lengthwise extent of the squeegee and arranged to flex the resilient member in the directions of two planes oblique to each other to maintain the respective portions of the squeegee substantially normal to the surface of the windshield upon which the squeegee portions are moved.

2. A windshield wiper for use on windshields having irregularly curved surface contours, comprising a squeegee, a resilient member for the operative support of the squeegee, and lever members connected to the resilient member and forming a superstructure for the positional maintenance of the resilient member, two of said lever members being pivotally joined at their ends to provide flexing of the resilient member in order to maintain surface conformance of the squeegee to the windshield surface, said lever members being so pivotally joined that the flexing will take place in the directions of two planes oblique to each other to maintain the respective portions of the squeegee substantially normal to the surface of the windshield upon which the squeegee portions are moved.

3. A windshield wiper for use on windshields having curved surfaces, comprising an elongated member adapted for wiping action upon the windshield, a resilient member arranged for the operative support of the elongated member, and a superstructure arranged for the positional control of the resilient member, said superstructure including a lever member pivotally connected to another lever member for movement about an axis obliquely arranged relative to the other lever member to cause non-coplanar movement of the lever members as they pivot about their connection and thereby twist one portion of said wiping member relative to another portion thereof.

4. A windshield wiper for use on windshields having curved surfaces, comprising an elongated member adapted for wiping action upon the windshield, a resilient member arranged for the operative surface conformance of the elongated member, and a superstructure arranged for the positional control of the resilient member, said superstructure including lever members pivotally connected for movement about an axis obliquely arranged relative to the lengthwise extent of the lever members to cause other than coplanar movement of the lever members as they pivot about their connection and thereby twist one end portion of said wiping member relative to the other end portion thereof.

5. A windshield wiper for use on windshields having curved surfaces, comprising an elongated member adapted for wiping action upon the windshield, a resilient member arranged for the operative support of the elongated member, a superstructure arranged for the positional control of the resilient member, said superstructure including lever members pivotally connected for movement about an axis obliquely arranged relative to the lengthwise extent of the lever members to cause non-coplanar movement of the lever members as they pivot about their connection and thereby twist one end portion of said wiping member relative to the other end portion thereof, and a spring arranged between the lever members and adapted to urge one of the levers about its pivoted connection.

6. A windshield wiper for use on windshields having curved surfaces, comprising an elongated member adapted for wiping action upon the windshield, a resiliently flexible member arranged for the operative support of the elongated member, a superstructure arranged for the positional control of the flexible member, said superstructure including lever members of unequal length pivotally connected for movement about an axis arranged oblique to the longitudinal axis of said levers to introduce a rotational component on the longitudinal axis of one of said lever members, thereby to twist one end portion of said wiping member relative to the other end portion thereof, and a clip member pivotally affixed to the superstructure at the mid-region of the wiper, said clip member being arranged for attaching the wiper to a windshield wiper arm.

7. A windshield wiper for use on windshields having curved surfaces, comprising a squeegee, a resilient member for the effective support of the squeegee, lever members forming a superstructure for the positional maintenance of the resilient member, two of said lever members being pivotally connected at their ends for movement about an axis obliquely arranged relative to the longitudinal axis of the lever members for the introduction of a rotational component on the longitudinal axis of one of said lever members as they pivot about their connection whereby one end portion of said squeegee is twisted relative to the other end portion thereof, a clip member pivotally affixed to the superstructure at the mid-region of the wiper, said clip member being arranged for attaching the wiper to a windshield wiper arm; and means interposed between one of the lever members and the clip member to cause pivoted movement of said lever member when the clip member is moved about its pivot.

8. A windshield wiper for use on windshields having curved surfaces comprising a squeegee, a resilient member for the effective support of the squeegee, lever members forming a superstructure for the positional maintenance of the resilient member, said lever members being pivotally connected at their ends for movement about an axis obliquely arranged relative to the longitudinal axis of the lever members for the introduction of a rotational component on the longitudinal axis of one of said lever members as they pivot about their connection whereby one end portion of said squeegee is twisted relative to the other end portion thereof, a clip member pivotally affixed to the superstructure at the mid-region of the wiper, said clip member being arranged for attaching the wiper to a windshield wiper arm, and resilient means interposed between one of the lever members and the clip member whereby the compressive forced developed upon the resilient means by rotary movement of the clip member will be applied to one of the lever members in a manner as to cause movement of said lever member about its pivot.

9. A windshield wiper for use on windshields having curved surfaces comprising a squeegee, a resilient member for the operative support of the squeegee, lever members forming a superstructure for the positional maintenance of the resilient member, said lever members being pivotally connected at their ends for movement about an axis obliquely arranged relative to the longitudinal axis of the lever members for the introduction of a rotational component on the longitudinal axis of one of said lever members as they rotate about their pivoted connection whereby one end portion of said squeegee is twisted relative to the other end portion thereof, a clip member pivotally affixed to the superstructure at the mid-region of the wiper, said clip member being arranged for attaching the wiper to a windshield wiper arm, and a torsional spring arranged to have one end engaging the clip member and the other end engaging a lever member whereby rotary movement of the clip member toward the squeegee will cause movement of said lever member toward the squeegee.

10. A wiper for curved windshields, comprising a wiper blade, and an elongated surface conforming support therefor having a centrally arranged arm-attaching part, and twist imparting means operable to impose a blade normalizing twist to the outer end portion of the blade.

11. A wiper for curved windshields, comprising a wiping blade, an elongated surface conforming support therefore having a centrally arranged arm-attaching part, and an outwardly disposed twist imparting means responsive to changes in the surface contour to impose a normalizing twist to the blade.

12. A wiper for curved windshields, comprising an oscillatory wiping blade, and an elongated surface conforming support therefor having a surface-conforming outer end portion spring-urged to follow the surface contour and hinged on a bias for imparting a blade normalizing twist to the outer end portion to maintain a normal attitude relative to the surface being wiped.

13. A windshield cleaner comprising a wiping blade, an oscillatory arm therefor, blade normalizing means acting to impart a normalizing twist to the outer end of the blade, and other means acting to rock the inner end of the blade to hold it in a normal attitude to the surface over which it is operating.

14. A cleaner for curved windshields comprising a surface conformable wiping blade, an oscillatory arm therefor, resilient normalizing means acting to twist the outer end of the blade to maintain it normal to the surface being traversed, and other means acting to rock the inner end of the blade to hold it in an attitude relatively normal to the surface over which it is traversing.

15. A curved windshield cleaner comprising a wiping blade, an oscillatory arm therefor, blade normalizing means responsive to changes in the surface contour and acting to impart a normalizing twist to the outer end of the blade, and a second means responsive to the arm and acting to rock the inner end of the blade to change its attitude, said two means coacting to progressively warp the blade throughout its length toward maintaining the blade attitude normal to the surface.

16. A windshield cleaner for curved surfaces, comprising a resilient wiping blade, an oscillatory arm therefor, normalizing means differentially affecting the blade to warp it longitudinally thereby tending to maintain portions thereof in a normal attitude to the windshield surface over which they are operating.

17. A wiper for curved windshields, comprising a flexible, resilient, elongated wiper blade, and an elongated resiliently flexible surface conforming support for the blade extending longitudinally thereof and having a centrally arranged arm-attaching part, and twist imparting means operable to impose a blade normalizing twist to an outer end portion of the blade to maintain the wiper blade substantially normal to the surface being wiped.

18. A wiper for a curved windshield comprising a wiping element, a superstructure for supporting said wiping element, said superstructure having a plurality of members each having a longitudinal axis, and means for providing a pivotal axis between certain of said members, said pivotal axis extending at an oblique angle to the longitudinal axis of at least one of said members.

19. A wiper for a curved windshield comprising a wiping element, a superstructure for supporting said wiping element, said superstructure having a plurality of members each having a longitudinal axis, and means for providing a pivotal axis between certain of said members, said pivotal axis extending at an oblique angle to said longitudinal axis of said members.

No references cited.